US009587590B2

(12) United States Patent
Ricart-Ugaz et al.

(10) Patent No.: US 9,587,590 B2
(45) Date of Patent: Mar. 7, 2017

(54) COORDINATING VARIABLE VALVE ACTUATION AND TURBOCHARGER OPERATION IN AN INTERNAL COMBUSTION ENGINE

(75) Inventors: Laura M. Ricart-Ugaz, Chicago, IL (US); Qianfan Xin, Lake Zurich, IL (US); Daniel Cornelius, Chicago, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 138 days.

(21) Appl. No.: 14/372,163

(22) PCT Filed: Jan. 17, 2012

(86) PCT No.: PCT/US2012/021557
§ 371 (c)(1),
(2), (4) Date: Jul. 14, 2014

(87) PCT Pub. No.: WO2013/109249
PCT Pub. Date: Jul. 25, 2013

(65) Prior Publication Data
US 2014/0366528 A1    Dec. 18, 2014

(51) Int. Cl.
*F02M 25/07* (2006.01)
*F01L 9/02* (2006.01)
(Continued)

(52) U.S. Cl.
CPC ......... *F02M 25/0713* (2013.01); *F01L 9/021* (2013.01); *F02B 37/00* (2013.01);
(Continued)

(58) Field of Classification Search
CPC ........ F02B 37/16; F02B 37/013; F02B 37/18; F02B 39/16; F02B 37/00; F02D 23/00;
(Continued)

(56) References Cited

U.S. PATENT DOCUMENTS 6,439,210 B1 * 8/2002 Faletti ................. F02D 13/0207
123/568.14
7,031,824 B2 * 4/2006 Gangopadhyay ... F02D 41/0052
123/684
(Continued)

*Primary Examiner* — Nicholas J Weiss
*Assistant Examiner* — Jason T Newton
(74) *Attorney, Agent, or Firm* — Jack D. Nimz; Jeffrey P. Calfa

(57) ABSTRACT

An engine control system coordinates control of a pressure regulating mechanism associated with a turbocharger turbine and control of a variable valve actuating (VVA) mechanism for expanding the range of possible exhaust gas recirculation rates over a large portion of an engine operating map to provide EGR rates which are greater than typical present-day levels while mitigating engine pumping losses by causing the turbocharger to operate with better efficiency in some regions of the map where it otherwise would not. Turbocharger efficiency is improved by controlling the VVA mechanism to set the timing of operation of its respective cylinder valves in accordance with a predetermined correlation of operating efficiencies of a compressor to timing of operation of respective engine cylinder valves, causing the compressor to operate at points of better efficiency than it otherwise would without use of VVA.

3 Claims, 4 Drawing Sheets

(51) Int. Cl.
| | |
|---|---|
| *F02B 37/00* | (2006.01) |
| *F02B 39/16* | (2006.01) |
| *F02D 13/02* | (2006.01) |
| *F02D 21/08* | (2006.01) |
| *F02D 23/00* | (2006.01) |
| *F02B 37/013* | (2006.01) |
| *F02B 37/16* | (2006.01) |
| *F02B 37/18* | (2006.01) |

(52) U.S. Cl.
CPC ............ *F02B 37/013* (2013.01); *F02B 37/16* (2013.01); *F02B 37/18* (2013.01); *F02B 39/16* (2013.01); *F02D 13/0207* (2013.01); *F02D 21/08* (2013.01); *F02D 23/00* (2013.01); *F02M 26/08* (2016.02); *F02M 26/10* (2016.02); *Y02T 10/144* (2013.01); *Y02T 10/18* (2013.01)

(58) Field of Classification Search
CPC ...... F02D 13/0207; F02D 21/08; F01L 9/021; F02M 26/08; F02M 26/10
USPC ................ 60/602, 605.2, 597, 598; 123/217
See application file for complete search history.

(56) References Cited

U.S. PATENT DOCUMENTS

| | | | | |
|---|---|---|---|---|
| 7,415,825 | B2 | 8/2008 | Lyons | |
| 7,877,997 | B2* | 2/2011 | Gruel | F02B 37/186 60/602 |
| 7,934,486 | B1* | 5/2011 | Styles | F01N 3/2066 123/406.23 |
| 2006/0060166 | A1* | 3/2006 | Huang | F02D 13/04 123/321 |
| 2008/0148727 | A1 | 6/2008 | de Ojeda | |
| 2009/0018751 | A1* | 1/2009 | Buckland | F02B 37/007 701/103 |
| 2009/0018756 | A1* | 1/2009 | Storhok | F02D 41/0007 701/105 |
| 2009/0266345 | A1* | 10/2009 | Sasaki | F02D 13/0261 123/568.22 |
| 2011/0000470 | A1* | 1/2011 | Roth | F02D 13/0249 123/568.11 |
| 2011/0036335 | A1* | 2/2011 | Wood | F02B 33/44 123/568.21 |
| 2014/0373816 | A1* | 12/2014 | Nagar | F02D 41/0007 123/51 B |

* cited by examiner

COORDINATING VARIABLE VALVE ACTUATION AND TURBOCHARGER OPERATION IN AN INTERNAL COMBUSTION ENGINE

TECHNICAL FIELD

This disclosure relates to an internal combustion engine which has a turbocharger (either single- or multiple-stage), external engine exhaust recirculation, and variable valve actuation.

BACKGROUND

Supercharging a diesel engine which powers a large commercial vehicle such as a truck or bus can improve engine/vehicle fuel economy and performance. A turbocharger is commonly used for supercharging such an engine. In the United States, governmental regulations also require that new vehicles comply with applicable tailpipe emission standards. Externally cooled, engine exhaust recirculation (commonly called EGR) is an effective technology for reducing oxides of nitrogen (NOx) in tailpipe emissions and may be useful in qualifying an engine design for compliance with certain tailpipe emission requirements.

While increasing EGR rates beyond present-day levels can further reduce NOx in tailpipe emissions, it appears that more devices would have to be added to a base diesel engine to accomplish that. The addition of such devices to a base engine may also impact other aspects of engine/vehicle operation such as engine/vehicle performance, durability, fuel economy, and/or manufacturing cost targets.

For example, it is known that moderate increases in EGR rates from typical present-day levels can be achieved by using one or more additional control valves, such as an intake throttle valve, for managing flow into the engine's cylinders. However, throttling the intake flow reduces engine efficiency, and the inclusion of additional components like an intake throttle valve may impair the ability to achieve EGR rate increases which are greater than moderate rates. Even if more than moderate increases in EGR rates can be achieved over a large portion of an engine operating map, significant engine pumping losses may occur in some regions of the map where the boosting system, i.e. the turbocharger, is operating with relatively poorer efficiency than in other regions.

EGR rate is affected by pressure in an exhaust manifold, i.e. by exhaust back-pressure. Control of exhaust back-pressure is an element of an engine control strategy because exhaust back-pressure can affect engine/vehicle performance, fuel economy, tailpipe emissions, and engine components including components in intake and exhaust systems. In a turbocharged diesel engine, a turbocharger can be used to control exhaust back-pressure.

Commercially available turbochargers have either single or multiple stages. Two types of turbochargers are wastegate turbochargers and variable geometry turbochargers (VGT's). In a two-stage wastegate turbocharger, a wastegate shunts a high-pressure turbine which is downstream of an exhaust manifold. The wastegate is in essence a valve that is controlled to selectively shunt engine exhaust around the high-pressure turbine.

When the wastegate is closed, all exhaust coming from the exhaust manifold, less any which may be recirculated as EGR in a high-pressure external EGR system, operates the high-pressure turbine. Increasingly opening the wastegate increasingly shunts engine exhaust around the high-pressure turbine. The extent to which the wastegate shunts engine exhaust affects not only exhaust back-pressure but also pressure developed in an engine intake manifold by the high-pressure turbine's operation of a high-pressure compressor in the intake system.

The difference between pressure in the intake manifold and pressure in the exhaust manifold affects both engine efficiency and external EGR flow.

Even if engine modifications like those mentioned earlier could be implemented successfully in an engine to create proper air/EGR charge over the entire engine speed-load domain for a range of EGR rates more extensive than typical present-day ranges, while at the same time meeting engine/vehicle performance and fuel economy targets for all engine operating conditions (e.g., EGR off, high altitude operation, cold start), the implementation is apt to add significant complexity, especially for a diesel engine which has a multi-stage turbocharger capable of developing high intake manifold pressure (i.e. boost).

Moreover, the engine modifications should not have significant adverse effects on other systems, such as exhaust after-treatment by processes such as selective catalytic reduction (SCR) and/or diesel particulate filter (DPF) which depend on proper exhaust temperature and composition.

SUMMARY

Briefly, the engine which is the subject of this disclosure comprises a turbocharger, external engine exhaust recirculation, and variable valve actuation (VVA). VVA refers to the ability to change the timing of operation of cylinder intake and/or cylinder exhaust valves. In the absence of VVA, cylinder valve timing is fixed by the shape of lobes on a camshaft which operate the cylinder valves. There are a variety of mechanisms that can be incorporated in an engine to provide VVA.

The engine which is the subject of this disclosure has a control system which coordinates control of a pressure regulating mechanism associated with a turbocharger turbine and control of the VVA mechanism for expanding the range of possible EGR rates over a large portion of an engine operating map to provide EGR rates which are greater than typical present-day levels when requested by an engine operating strategy, while mitigating engine pumping losses by causing the turbocharger to operate with better efficiency in some regions of the map where it otherwise would not.

Turbocharger efficiency is improved by controlling a VVA mechanism to set the timing of operation of its respective cylinder valves in accordance with a predetermined correlation of operating efficiencies of a compressor stage to timing of operation of its respective cylinder valves, causing the compressor stage to operate at points of better efficiency than it otherwise would without use of VVA.

Engine efficiency losses are mitigated when exhaust back-pressure is to be changed from an existing back-pressure to a different one. Mitigation is achieved by using VVA alone without adjusting the current setting of a turbocharger wastegate or adjusting current position of turbocharger vanes. The wastegate setting is changed or vanes adjusted, only when VVA by itself is unable to change existing exhaust back-pressure to a different one.

This strategy of coordinating use of VVA and control of turbocharger wastegate or vanes can accomplish engine volumetric efficiency manipulation appropriate to changes in engine operation that mitigate efficiency losses while providing proper control over EGR rate, boost pressure, and intake airflow rate and also obeying all relevant engine design constraints including peak cylinder pressure, compressor outlet temperature, exhaust manifold gas temperature, and turbocharger speed.

The strategy can be used during different engine operating conditions such as EGR off, high altitude operation, cold start, engine braking, and after-treatment device regeneration.

For an engine which can have a range of EGR rates extending from no EGR to a rate which is significantly greater than typical present-day EGR rates, a turbocharger sized for the greater EGR rates can be sized relatively smaller. The smaller size can be helpful by improving "spool-up" capability for example, but at relatively lower EGR rates, the smaller sized device may be subject to certain unfavorable operating conditions. For example, temperature and speed may exceed specified limits for the particular turbocharger selected. To avoid exceeding those limits, EGR can be increased and/or VVA can be used. Using VVA in preference to increasing EGR rate reduces cooling demand, and that is helpful when the engine is operating at higher altitudes, for example those at which tailpipe emissions may not be regulated, because it can avoid having to reduce engine power. Use of VVA is also helpful for handling certain transients in engine operation, and in minimizing or even eliminating use of wastegate or vane-adjustment.

When no EGR is being used, the entire exhaust flow is directed toward the turbine, and that can elevate exhaust back-pressure sufficiently to call for use of the wastegate or vane adjustment. However in a two-stage turbocharger, using the wastegate or vanes forces more of the flow coming from the exhaust manifold around a high-pressure turbine to a low-pressure turbine, increasing the latter turbine's speed. VVA can be used to increase boost, which reduces the pressure differential across the engine and can mitigate temperature/speed increases.

One general aspect of the claimed subject matter relates to the method defined by independent claim 1.

Another general aspect of the claimed subject matter relates to the method defined by independent claim 4.

The foregoing summary is accompanied by further detail of the disclosure presented in the Detailed Description below with reference to the following drawings that are part of the disclosure.

DETAILED DESCRIPTION

Figure 1:
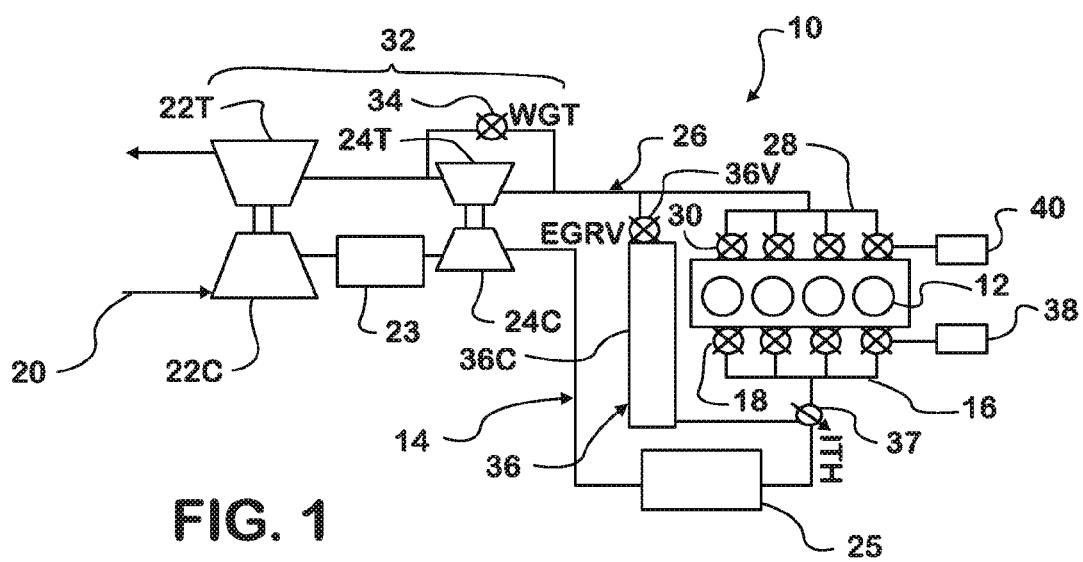
FIG. 1 is a general schematic diagram of an engine which is the subject of this disclosure.

In FIG. 1 an internal combustion engine 10 comprises structure which forms engine cylinders 12 within which fuel combusts with air to operate the engine. Engine 10 further comprises an intake system 14 serving engine cylinders 12 through an intake manifold 16, and cylinder intake valves 18 controlling admission of a fluid mixture which has an air component and an engine exhaust component from intake manifold 16 into engine cylinders 12.

Intake system 14 further comprises an air inlet 20 through which the air component of the mixture enters intake system 14, a compressor 22C in downstream flow relation to air inlet 20 and a compressor 24C in downstream flow relation to compressor 22C. When operating, compressors 22C, 24C cooperate to elevate the pressure of the mixture in intake manifold 16 to superatmospheric pressure. Some heat of compression of air that has been compressed by compressor 22C is removed by an inter-stage cooler 23 between the two compressors, and some heat of compression of air that has been compressed by compressor 24 is removed by a charge air cooler 25.

Engine 10 further comprises an exhaust system 26 for conveying exhaust created by combustion of fuel in engine cylinders 12 away from engine cylinders 12. Exhaust system 26 comprises an exhaust manifold 28 serving engine cylinders 12. Engine 10 comprises cylinder exhaust valves 30 controlling admission of exhaust from engine cylinders 12 into exhaust manifold 28 for further conveyance through exhaust system 26.

Exhaust system 26 comprises a turbine 24T in downstream flow relationship to exhaust manifold 28 and a turbine 22T in downstream flow relationship to turbine 24T. Turbine 24T is coupled by a shaft to operate compressor 24C so that the two collectively form a high-pressure turbocharger stage. Turbine 22T is coupled by a shaft to operate compressor 22C so that the two collectively form a low-pressure turbocharger stage. An after-treatment system, not shown in FIG. 1, is typically present downstream of turbine 22T for treating exhaust before it passes through a tailpipe to the surrounding atmosphere.

The two turbine-compressor stages form a multi-stage turbocharger 32, which may be either a wastegate type turbocharger or a two-stage variable geometry type turbocharger (VGT). FIG. 1 illustrates a wastegate type turbocharger having a wastegate 34 shunting turbine 24T. If the turbocharger were a single-stage type, turbine 22T, compressor 22C, and inter-stage cooler 23 would not be present. Some two-stage turbochargers other than the one shown in FIG. 1 might include a second wastegate shunting turbine 22T.

Engine 10 further comprises an exhaust gas recirculation (EGR) system 36 which serves to provide the exhaust component of the mixture by conveying a portion of exhaust from exhaust system 26 to intake system 14. FIG. 1 shows EGR system 36 to be a high-pressure type EGR system because the point of EGR diversion from exhaust system 26 is upstream of turbine 24T and the point of introduction into intake system 14 is downstream of compressor 24C. EGR system 36 comprises an EGR valve 36V for selectively restricting exhaust flow from exhaust system 26 to intake system 14, and a heat exchanger (sometimes called an EGR cooler) 36C through which some heat can be rejected from recirculated exhaust to circulating coolant and finally rejected to outside air at a radiator.

Downstream of the point at which recirculated exhaust is introduced into intake system 14 is an intake throttle 37 that can be operated to throttle intake flow into intake manifold 16.

Engine 10 comprises respective mechanisms 38, 40 sometimes referred to as variable valve actuation (VVA) mechanisms, for controlling the timing of opening and/or closing of cylinder intake valves 16 and cylinder exhaust valves 30 respectively during engine cycles. An example of a VVA mechanism is contained in U.S. application Ser. No. 12/540,828, filed 13 Aug. 2009 and incorporated herein by reference.

In the absence of VVA, exhaust back-pressure would be controlled by wastegate 34. Increasingly opening the wastegate increasingly relieves exhaust back-pressure by increasing the quantity of exhaust shunted around turbine 24T, thereby reducing exhaust back-pressure. Although it does pass through turbine 22T, the shunted exhaust does not operate turbine 24T, and so a significant portion of the heat energy is not recovered by either turbine, thereby decreasing engine efficiency.

In order to mitigate the decrease in engine efficiency when exhaust back-pressure is to be changed, the engine uses a strategy involving one or both VVA mechanism 38, 40.

One aspect of the strategy comprises changing the timing of operation of cylinder intake valves 18 and/or cylinder exhaust valves 30 by the respective VVA mechanisms without changing the existing setting of wastegate 34. When the respective VVA mechanism by itself is unable to change the timing of operation of cylinder intake valves 18 and/or cylinder exhaust valves 30 enough within allowable timing limits to change exhaust back-pressure to a requested back-pressure, then the existing setting of wastegate 34 is changed to a different setting. In other words, preference is given to exclusive use of VVA to accomplish the change to the requested exhaust back-pressure, but when VVA alone is unable to satisfy the request, then wastegate 34 is used.

Figure 2:
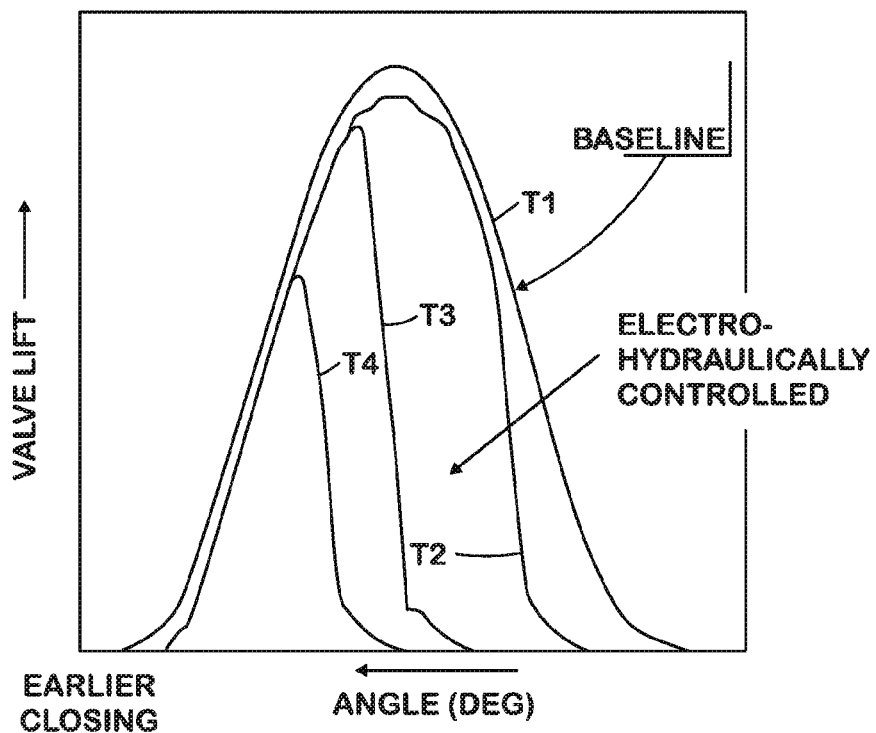
FIG. 2 shows an example of the effect of VVA on cylinder intake valve closing.

An example of using VVA to reduce exhaust back-pressure is to advance the closing time of cylinder intake valves 18 as portrayed by FIG. 2. Baseline intake valve opening is shown by the valve lift trace T1 with closing occurring at some number of degrees before top dead center (TDC). Traces T2, T3, and T4 show several earlier valve closing times. A VVA mechanism which can provide such a range of cylinder valve closings is a hydraulically controlled mechanism which interacts with the cylinder valve as the valve is being operated by a camshaft lobe.

Another aspect of the strategy involving the use of one or both VVA mechanisms 38, 40 is to set the timing of operation of the respective cylinder valves in accordance with a predetermined correlation of operating efficiency of compressors 22C, 24C to the timing of operation of the respective cylinder valves. The correlation is determined by plotting compressor operating efficiency points on a compressor operating efficiency diagram such as the ones shown in FIGS. 3 and 4 for a variety of different operating conditions as a function of intake valve timing and/or exhaust valve timing. Intake valve timing and/or exhaust valve timing is/are varied over timing ranges that are defined by allowable timing limits for cylinder valve opening and closing. As timing is varied for each engine operating condition, compressor operating efficiency is measured. At some timings, compressor operating efficiency is higher and at other timings, compressor operating efficiency is lower.

Figure 3:
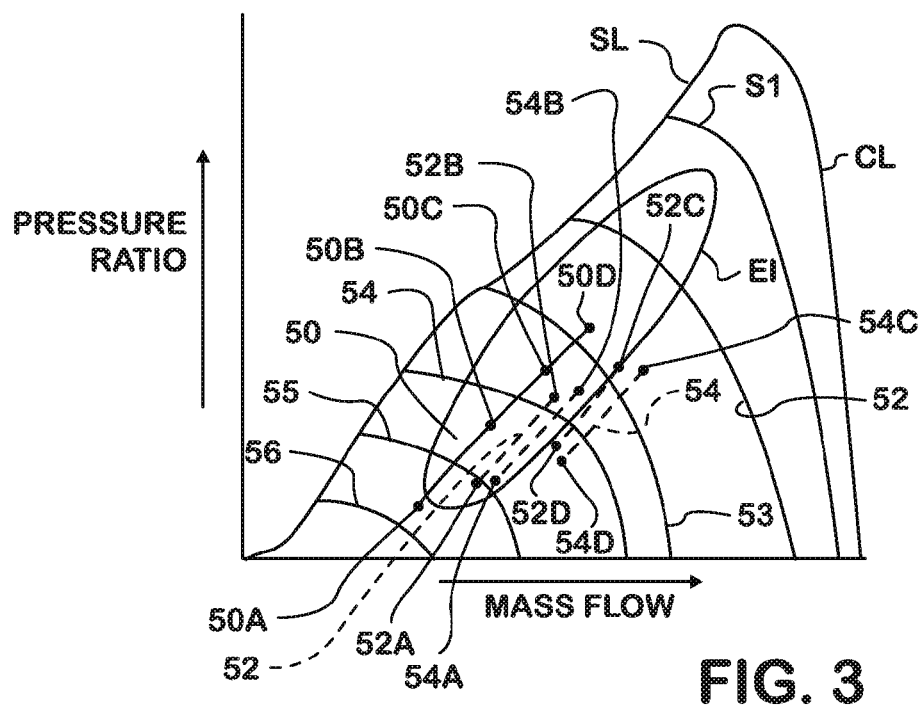
FIG. 3 is a compressor operating efficiency diagram for different engine operating conditions at fixed base timing of opening and closing of cylinder intake valves.

FIG. 3 shows various data points which are representative of a turbocharger's operation without use of VVA. In the case of a two-stage turbocharger, FIG. 3 could represent either stage or the combined stages. The line marked 50 represents compressor operating efficiency when engine 10 is operating at a first engine speed. The line marked 52 represents compressor operating efficiency when engine 10 is operating at a second engine speed. The line marked 54 represents compressor operating efficiency when engine 10 is operating at a third engine speed. The data points marked on each line, such as 50A, 50B, 50C, 50D; 52A, 52B, 52C, 52D; and 54A, 54B, 54C, 54D, represent different engine loads at the respective speed.

A compressor operating efficiency diagram such as FIG. 3 is characterized by zones of different efficiencies, commonly called efficiency islands, which lie between the compressor surge line SL and the compressor choke line CL. One such efficiency island EI is marked in FIG. 3. Also marked in FIG. 3 are various turbocharger speed lines such as S1, S2, S3, S4, S5, and S6.

The zone inside the boundary of efficiency island EI can be considered a relatively greater efficiency zone in comparison to zones lying outside. Line 50 lies substantially on the crest of a ridge running generally centrally within efficiency island EI as shown. Lines 52 and 54 do not. The crest of the ridge lies along a line of greatest compressor operating efficiency. The crest is sometimes referred to the spine of a compressor efficiency map. For greatest compressor operating efficiency at all engine speeds all operating points should lie of the spine.

Figure 4:
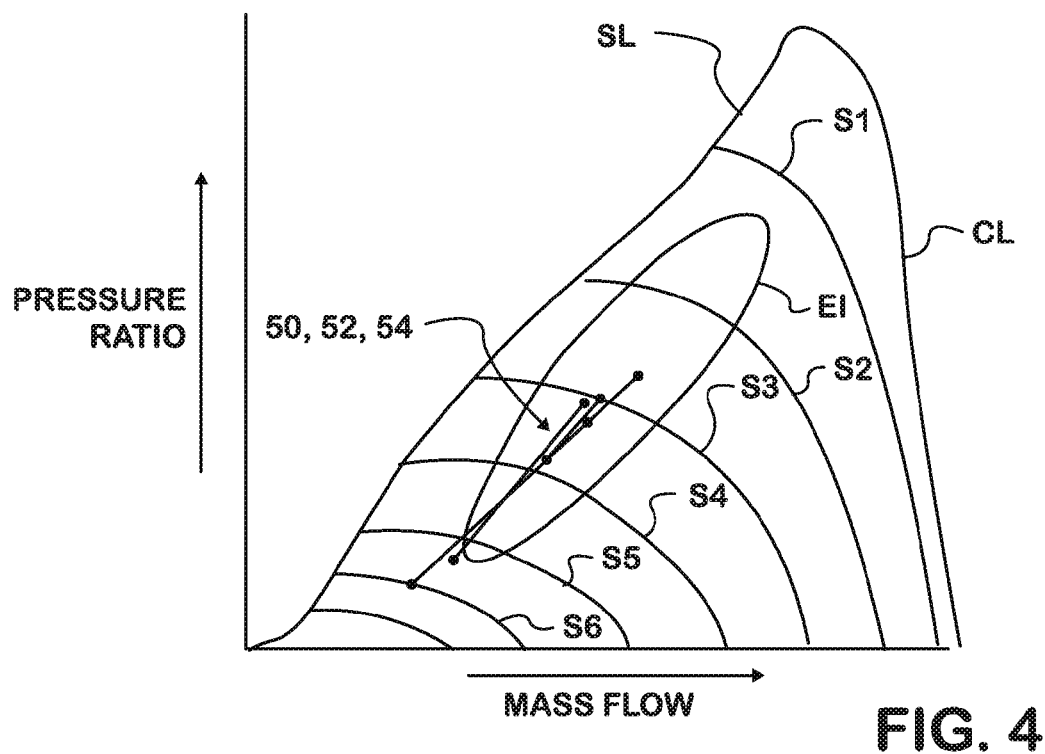
FIG. 4 is a compressor operating efficiency diagram showing more efficient operating points for the engine operating conditions shown in FIG. 3 as a result of using VVA to set cylinder intake valve closing timing in accordance with a predetermined correlation of timing of cylinder intake valve closing to compressor operating efficiency.

By appropriate use of VVA, lines 52 and 54 can be brought substantially onto the spine, as shown in FIG. 4.

In order to develop a correlation of VVA to compressor operating efficiency for relocating lines 52 and 54 from their relatively lower efficiency locations shown in FIG. 3 to the spine, VVA is varied at different combinations of engine speed and engine load during engine development to find a value for VVA timing, such as timing of cylinder intake valve closing, which for each speed/load combination, places compressor operation at least within the efficiency island EI, and ideally substantially on the spine. The correlation is used to create a map of VVA timing which is a function of engine speed and engine load. The map can then be programmed into an engine control system as a look-up table which is used by the engine control strategy to enable the compressor to operate at relatively greater efficiency over a larger portion of its efficiency diagram that it otherwise would in the absence of VVA.

When engine 10 is operating at higher altitudes above which current tailpipe emission regulations may not apply, engine cooling is hampered by the reduced density of ambient air which passes through heat exchangers in comparison to density at sea level.

When cooled EGR is being used at higher altitudes, the cooling load can be reduced by using less EGR. However, for a turbocharger which is sized for EGR rates significantly greater than typical present-day EGR rates, reducing EGR too much can overwork/overspeed/overheat the turbocharger.

An appropriate EGR rate may mitigate overworking/overspeeding/overheating the turbocharger, but that increases the cooling load on the engine. If the cooling system cannot handle the cooling load, engine power may have to be reduced.

Figure 5:
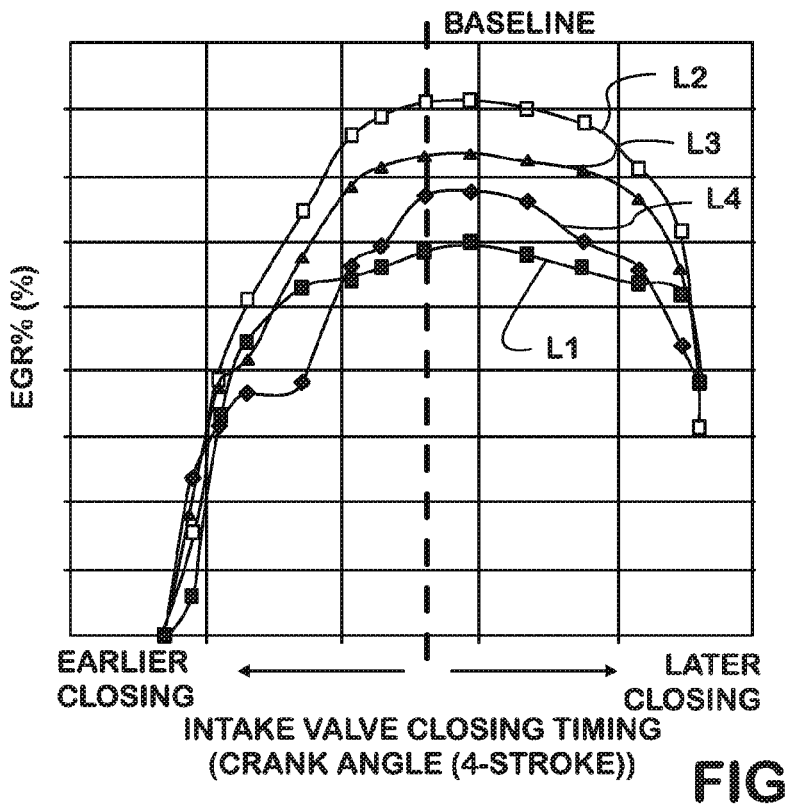
FIGS. 5, 6, and 7 are diagrams relating VVA timing to EGR %, fresh air flow, and engine heat rejection respectively.

Model simulation shows that VVA can be used to control EGR rate at different engine loads L1, L2, L3, L4 to sufficiently mitigate overworking/overspeeding/overheating the turbocharger. FIG. 5 shows that EGR rate is reduced when intake valve closing is either advanced or retarded a suitable number of degrees from a baseline timing. L1 represents the largest of the four loads, with L2, L3, and L4 being progressively smaller.

Figure 6:
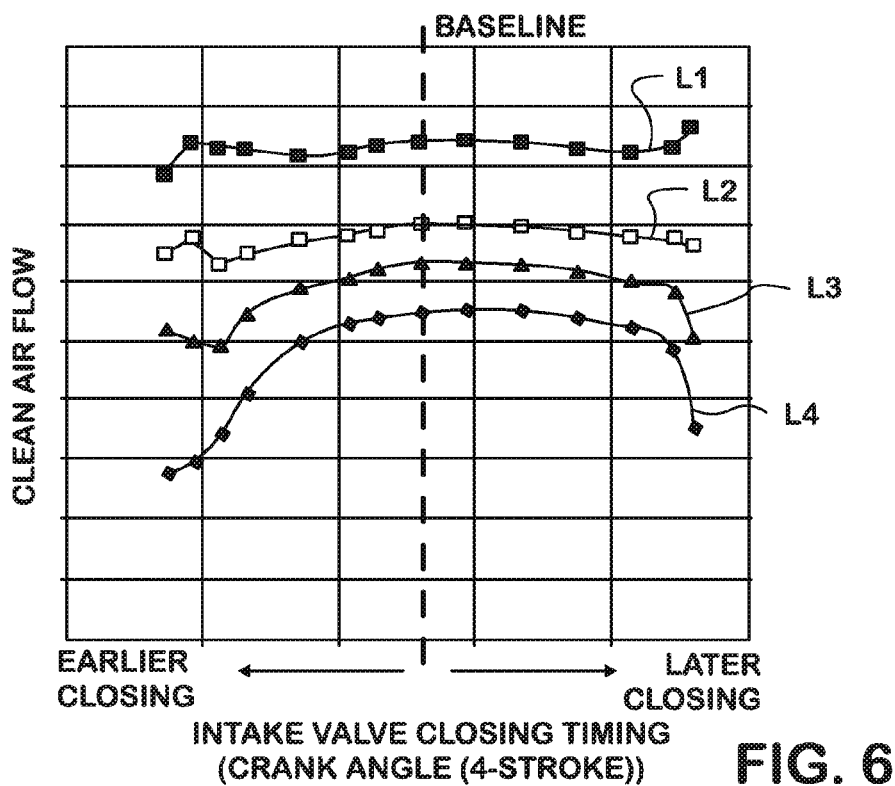

FIG. 6 shows that VVA, when used to reduce EGR rate, doesn't significantly affect fresh air flow rate within a range of VVA timings on either side of baseline valve timing at engine loads L1, L2, L3, L4. This shows that sufficient combustion air will enter the engine cylinders.

Figure 7:
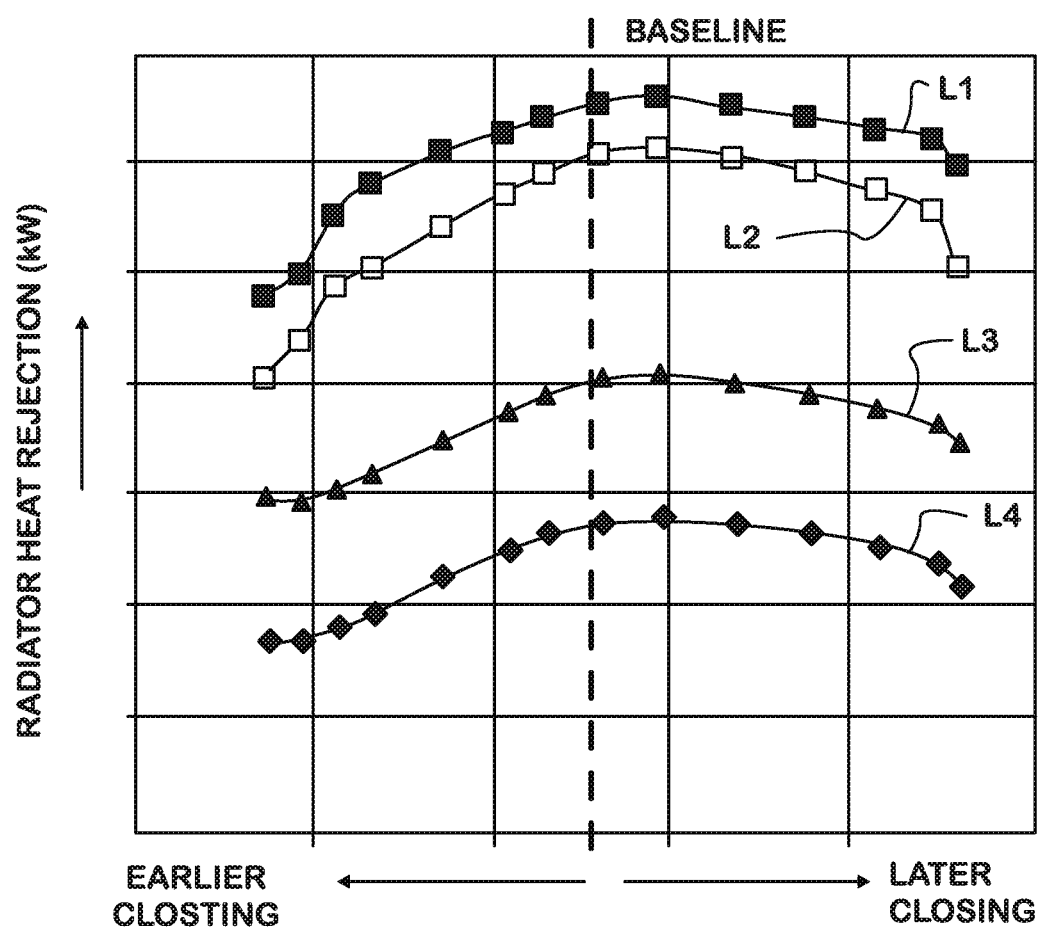

FIG. 7 shows how use of VVA influences engine cooling load. Over portions of the range of VVA timing at the different loads, cooling load is not seriously affected, making it unnecessary to limit engine power.

What is claimed is:

1. A method for changing pressure in an exhaust manifold of an internal combustion engine, comprising:
providing engine structure comprising engine cylinders within which fuel is combusted to operate the engine,
providing a turbocharger comprising at least one turbine for operating at least one compressor,
providing an exhaust system through which engine exhaust created in the engine cylinders is conveyed from the engine cylinders, the exhaust system comprising an exhaust manifold through which engine exhaust leaves the engine cylinders, at least one of the turbines of the turbocharger being in downstream flow relation to the exhaust manifold and operated by engine exhaust, and a variable valve pressure control element which is operable to different settings of interaction with the at least one turbine to control pressure in the exhaust manifold,
providing cylinder exhaust valves for controlling admission of engine exhaust from the engine cylinders into the exhaust manifold,
providing an intake system comprising an intake manifold through which a mixture having an air component for supporting combustion of fuel and an engine exhaust component enters the engine cylinders,
providing cylinder intake valves for controlling admission of the mixture from the intake manifold into the engine cylinders,
further providing the intake system with an air inlet through which the air component enters the intake system, and the at least one compressor of the turbocharger being in downstream flow relation to the air inlet and operated by the turbine with which the variable valve pressure control element interacts for causing pressure of the mixture in the intake manifold to be superatmospheric,
providing an exhaust gas recirculation (EGR) system for conveying the engine exhaust component of the mixture from the exhaust system to the intake system,
controlling the opening and closing movement of the cylinder intake valves, and controlling the opening and closing of the cylinder exhaust valves such that at least one of the valves is controllable to change the timing of its operation, and
during engine operation;
changing the timing of operation of at least one of the cylinder intake valves without changing an existing setting of the variable valve pressure control element, and when changing the timing of operation of at least one of the cylinder intake valves without changing an existing setting of the variable valve pressure control element is by itself unable to change the existing pressure in the exhaust manifold to a different pressure, changing the existing setting of the variable valve pressure control element to a different setting to change the existing pressure in the exhaust manifold to the different pressure.

2. The method set forth in claim 1 in which the variable valve pressure control element comprises a selectively operable valve shunting the turbine with which the variable valve pressure control element interacts.

3. A method for changing pressure in an exhaust manifold of an internal combustion engine, the method comprising:
providing an engine structure comprising engine cylinders within which fuel is combusted to operate the engine,
providing an exhaust system through which engine exhaust created in the engine cylinders is conveyed from the engine cylinders, the exhaust system comprising an exhaust manifold through which engine exhaust leaves the engine cylinders, a turbine in downstream flow relation to the exhaust manifold and operated by engine exhaust, and a variable valve-pressure control element which is operable to different settings of interaction with the turbine to control pressure in the exhaust manifold,
providing cylinder exhaust valves for controlling admission of engine exhaust from the engine cylinders into the exhaust manifold,
providing an intake system comprising an intake manifold through which a mixture having an air component for supporting combustion of fuel and an engine exhaust component enters the engine cylinders,
providing cylinder intake valves for controlling admission of the mixture from the intake manifold into the engine cylinders,
further providing the intake system with an air inlet through which the air component enters the intake system, and also a compressor in downstream flow relation to the air inlet and operated by the turbine for causing pressure of the mixture in the intake manifold to be superatmospheric,
providing an exhaust gas recirculation (EGR) system for conveying the engine exhaust component of the mixture from the exhaust system to the intake system,
providing an intake valve operating mechanism for operating the cylinder intake valves,
at least one of the cylinder intake valves being operable to change timing of its opening and closing operation, and
during engine operation;
operating at least one of the cylinder intake valves to set the timing of its operation in accordance with a predetermined correlation of compressor operating efficiency at each of various combinations of engine speed and engine load to timing of operation of the respective cylinder valves, which correlation, for each of at least some of the combinations, places the corresponding correlated compressor operating efficiency at a location of greater efficiency on a predetermined compressor operating efficiency diagram than the location for the corresponding combination on a predetermined compressor operating efficiency diagram representing compressor operating efficiency when the respective cylinder valves are operated at a fixed baseline timing.

* * * * *